June 15, 1954
R. A. WYLIE
2,680,912
SIZE GAUGING DEVICE
Filed Nov. 25, 1950
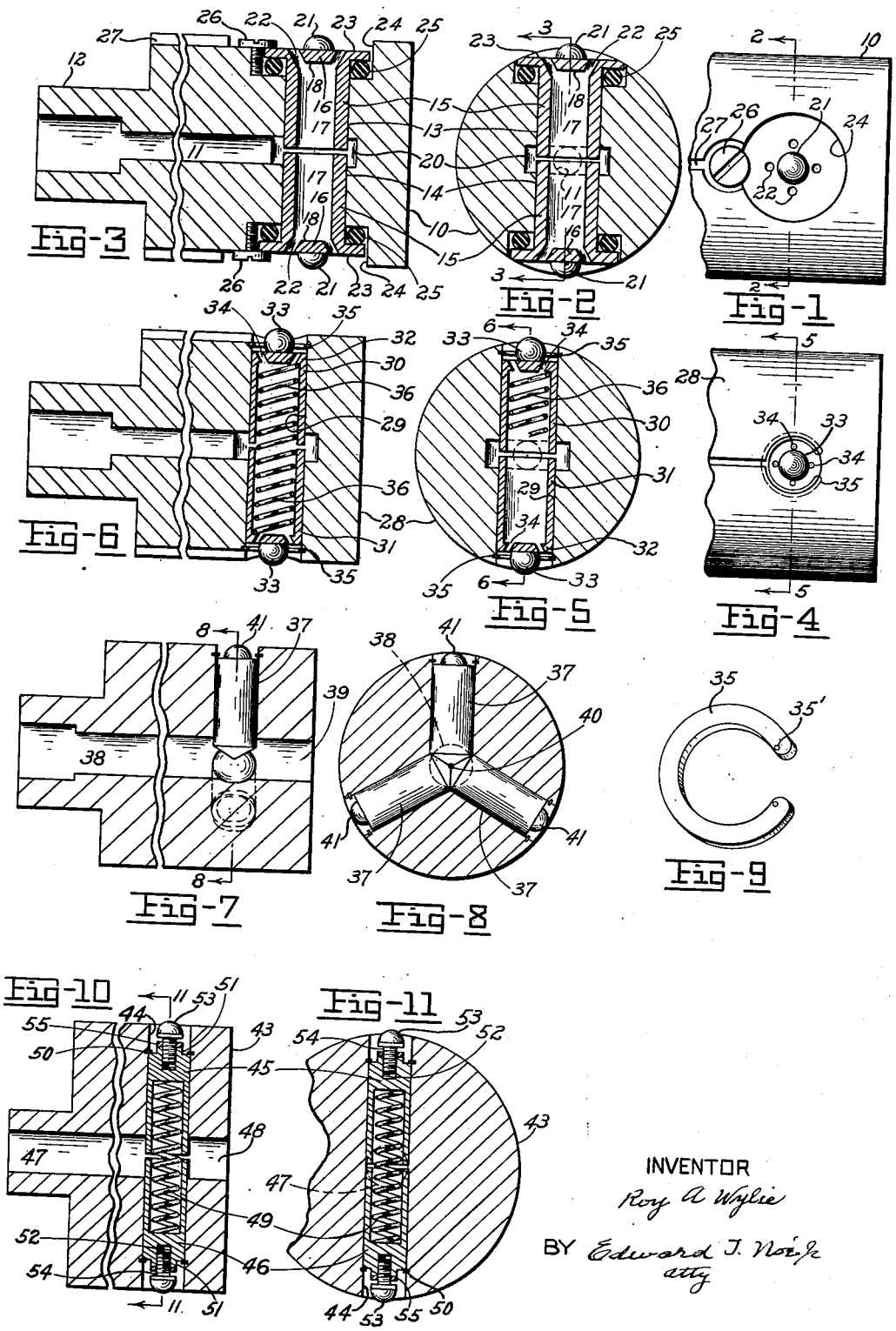
INVENTOR
Roy A Wylie
BY Edward J. Noe Jr
atty Patented June 15, 1954

2,680,912

UNITED STATES PATENT OFFICE 2,680,912

SIZE GAUGING DEVICE

Roy A. Wylie, Rockford, Ill., assignor, by mesne assignments, to The Sheffield Corporation, Dayton, Ohio, a corporation of Ohio Application November 25, 1950, Serial No. 197,553

4 Claims. (Cl. 33—178)

This invention relates to form or dimension gauges and more particularly to gauge heads for use with air gauges or the like which are responsive to changes in the flow of air or other fluid under pressure.

One object of the invention is the provision of a gauge head of the character mentioned having movable work contacting portions and adapted to accurately gauge or measure the inside dimension of a circular bore even though more pressure may be exerted on one side of the gauge head than the other with respect to the work being gauged.

Another object is the provision of a gauge head of simple construction embodying a plurality of opposed plungers that conjointly provide a variable air gap to control the flow of air through the gauge head, the outer portions of the plungers having fluid relief openings through which all the air supplied through the variable air gap is discharged.

Another object is the provision of a gauge head having work contacting plungers slidable radially and limited against excessive outward travel and yieldingly held outwardly by means of simple construction enabling the convenient assembly and disassembly of the parts.

Other objects and advantages of the invention will be apparent from the following description, the appended claims and the accompanying drawing, in which, Fig. 1 is a side elevation of a gauge head embodying the present invention;

Fig. 2 is a transverse section on the line 2—2 of Fig. 1;

Fig. 3 is a longitudinal section on the line 3—3 of Fig. 2;

Fig. 4 is a side elevation of a gauge head of modified construction;

Fig. 5 is a section on the line 5—5 of Fig. 4;

Fig. 6 is a section on the line 6—6 of Fig. 5;

Fig. 7 is a longitudinal section of another modification of the gauge head;

Fig. 8 is a section on the line 8—8 of Fig. 7;

Fig. 9 is a detail of one of the retainer rings;

Fig. 10 is a longitudinal section of a further modification of the invention; and Fig. 11 is a section on the line 11—11 of Fig. 10.

Referring more particularly to the drawing in which the same reference numerals are applied to like parts in the different views, the work engaging member as herein shown in the form of construction illustrated in Figs. 1, 2 and 3 comprises a body 10 of generally cylindrical form and adapted to enter a round hole to gauge the diameter of the hole, the diameter of the body being slightly less than the diameter of the hole to be gauged. It will be obvious however that the invention is not limited to the gauging of internal diameters of a workpiece.

The body 10 is provided with an axially extending fluid supply path 11 and has an end portion 12 that can be conveniently connected to a conduit that extends from a fluid flow gauging device of any suitable character capable of measuring the flow taking place through the passage 11 or indicating such flow in terms of physical dimensions. The flow through the passage 11 is controlled by a plurality of plungers 13 and 14 which are held outwardly in yielding contact with the work. These plungers are slidably guided in a diametrical cylindrical bore in the body. Each plunger comprises an annular wall 15 and a head portion 16 so there is a chamber or space 17 inside the plunger. The inner terminal end of the plunger provides a flat surface 18 facing the flat surface of the opposing plunger so that the inner ends of the two plungers conjointly form a variable air gap which is in communication with the fluid supply path 11. The middle portion of the bore in the body is preferably enlarged as indicated at 20 so there is free communication between the fluid supply path 11 and the entire annular opening of the adjustable air gap.

Fixed in the head portion of the plunger 13 is a work engaging contact 21 preferably of carbide or other hard metal. In the head and around the contact 21 are several fluid relief passages 22 so that all the air which leaks through the variable air gap can be relieved through the plungers at a point near the work contacting element and flow along a longitudinal groove 27 in the body to the end of the hole being gauged. It will be apparent that the two plungers and the manner in which they are arranged in the body are similar. The head portion 16 has an outwardly extending flange 23 which is received in a recess 24 in the body member. Between the flange and the bottom of the recess is a circular ring 25 of rubber or other similar yielding material, of such size that in operation it is held somewhat compressed so as to act as a seal against fluid leakage around the outside of the plunger and also as a means for yieldingly holding the plunger radially outwardly against a stop. This stop is a screw 26 threaded in the body and extending over the flange 23, as will be apparent from Figs. 1 and 3.

When the yielding ring 25 holds the plunger out against the head of the screw 26 the outer end of the work contactor 21 is a little distance outwardly of the adjacent portions of the body member to insure contact with the workpiece being gauged. Obviously by removing the screw 26 the plunger can be instantly removed. The lengths of the plungers are such that when the two work contactors engage a workpiece of nominal size, the air gap between the inner ends of the plungers will be of the order of a few ten-thousandths of an inch and effectively control the rate of flow through the gauge head. It will be apparent that since the two plungers cooperate with one another in forming a single air gap or orifice, any undue pressure applied on one side or the other of the workpiece will have no effect at all on the size of the air gap.

In accordance with the modified construction shown in the Figs. 4 to 6 inclusive, the gauge head comprises a body 28 with a diametrical bore 29 in which plungers 30 and 31 are slidably mounted, the inner ends of these plungers being closely spaced apart and cooperating to provide a single air restriction of variable size. The head portion 32 of the plunger 30 for example is provided with a work contactor 33 and has several outlet openings 34 through which air passes from the hollow interior of the plunger to the outside. A split retaining ring 35 arranged in an annular groove in the body forms a stop for limiting the outward movement of the plunger. Preferably the stop ring 35 has a small opening 35' at each end thereof so that a tool can be inserted in these openings in order to compress the ring and permit its removal. The hollow plungers contain a compression spring 36 engaging the inner sides of the heads of the plungers and act to yieldingly hold them against the stop rings 35.

In the constructions illustrated in Figs. 7, 8 and 9, there are three plungers 37 arranged 120 degrees apart. In this case the plungers conjointly control the flow of fluid from the supply path 38 to a relief opening 39 in alignment wth the supply path, there being no discharge through the plungers themselves. The inner ends of the plungers are conically shaped. The tip portions of the cones are preferably ground or honed off to form a small central opening 40 when the plungers are fully depressed. In a normal gauging operation the air pressure exerted on the inner ends of the plungers serve to urge them outwardly and hold the work contactors 41 engaged with the workpiece and under these conditions there is a leakage orifice of generally Y shape which controls the flow of fluid supplied under pressure to the passage 39.

In accordance with the construction shown in Figs. 10 and 11, the body member 43 has a diametrical bore 44 slidably guiding the two opposed plungers 45 and 46 the inner ends of which provide an adjustable orifice between the fluid supply path 47 and the discharge opening 48. A spring 49 urges the plungers outwardly in contact with split spring rings 50 arranged in grooves in the cylindrical bore and forming stops controlling the outer limit of movement. In the head portion 51 of each of the plungers is a threaded recess 52. The hard work contactor portion 53 is fixed to a threaded stem 54 which is adjustably arranged in the threaded recess 52. A lock nut 55 threaded on the stem can be turned by a suitable socket wrench type of tool tightly into engagement with the end of the plunger. As wear takes place on the work contactor portions of this gauge and corrections are required, the lock nut can be loosened and the work contacting element turned until the size of the adjustable orifice is such as to give a proper reading on the indicator. It will be apparent that the work contacting elements of the modifications first described can be adjustably mounted in the head portion of the plungers in the manner shown in Figs. 10 and 11.

In applying a gauge head of the character herein described or when the work is applied to the gauge head, if the gauge head is fixed, a greater pressure may be applied to one side of the work than the other but the conjoint action of the two work contacting members is effective in controlling the total flow through the gauge head. It will be obvious that if the gauge head is not exactly centered with the work, an accurate control of the fluid leakage will take place nonetheless. The device is extremely simple, easily manufactured, assembled and disassembled. It will also be apparent that since the inner portions of the plungers are guided directly in the cylindrical radially extending passages in the body portion, the size of the bore in the body portion need not be unduly large and the number of parts are kept to a minimum.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A gauge head of the character described adapted for use with an air gauge or the like, comprising a body having a fluid supply path and a pair of similar aligned transverse passages in communication therewith, a pair of similar plungers, one slidable longitudinally in each of said passages, the inner ends of said plungers being flat and closely spaced apart to provide a variable air gap therebetween in communication with said fluid supply path and the outer ends of said plungers having work contacting portions normally extending beyond the adjacent portions of the body, stop means for limiting outward travel of said plungers, yielding means urging said plungers towards engagement with said stop means, said plungers having passages extending generally longitudinally therethrough providing for the discharge of all the air passing through said variable air gap at locations closely adjacent the work contacting portions of the plungers.

2. A gauge head of the character described adapted for use with an air gauge or the like, comprising a body having a fluid supply path and a transverse bore intersecting said path, a pair of diametrically opposed plungers of like form and size slidably operable directly in said bore and each having a central inner recess, the inner ends of said plungers having flat opposed annular surfaces closely spaced apart to provide a variable air gap communicating throughout its entire periphery with said fluid supply path, each plunger having an outer head, a work contacting portion arranged centrally on the head of each plunger and fluid relief passages extending from the inner ends of said plungers and terminating in the head portions of said plungers and providing a free outlet for fluid supplied through said variable air gap, and stop means for limiting outward travel of said plungers.

3. A gauge head of the character described adapted for use with an air gauge or the like, comprising a body having a fluid supply path and a pair of similar aligned transverse passages in communication therewith, a pair of similar plungers, one slidable longitudinally in each of said passages, the inner ends of said plungers being flat and closely spaced apart in opposing relationship to provide a variable air gap therebetween in communication with said fluid supply path, the outer ends of said plungers each having a central work contacting portion normally extending beyond the adjacent portions of the body, means for limiting outward travel of said plungers, yielding means urging said plungers outwardly, said yielding means comprising a sealing ring of yielding material for each of said plungers, the body having seating means for each sealing ring, and a head portion at the outer end of each plunger overlying the respective ring, and relief means for the discharge of fluid under pressure passing through said variable air gap.

4. A gauge head of the character described adapted for use with an air gauge or the like, comprising a body having a fluid supply path and a pair of similar aligned transverse passages in communication therewith, a pair of similar plungers, one slidable longitudinally in each of said passages, the inner ends of said plungers being flat and closely spaced apart to provide a variable air gap therebetween in communication with said fluid supply path, the outer ends of said plungers each having a central work contacting portion normally extending beyond the adjacent portions of the body, means for limiting outward travel of said plungers, yielding means urging said plungers outwardly, said yielding means comprising a spring housed at opposite ends thereof within said plungers, a chamber in each plunger receiving one end of said spring, each plunger having an outer head portion provided with an annular series of passages around the work contacting portion thereof communicating with the respective chamber, the chamber and series of passages forming the fluid relief passage through the respective plunger.

References Cited in the file of this patent

UNITED STATES PATENTS

| Number | Name | Date |
|---|---|---|
| 1,591,261 | Ames | July 6, 1926 |
| 1,658,994 | Lauer | Feb. 14, 1928 |
| 2,208,910 | Pampel et al. | July 23, 1940 |
| 2,375,600 | Wattebot | May 8, 1945 |
| 2,501,965 | Rupley | Mar. 28, 1950 |
| 2,566,321 | Eisele | Sept. 4, 1951 |
| 2,590,151 | Bryant et al. | Mar. 25, 1952 |
| 2,622,331 | Haines | Dec. 23, 1952 |